US006996994B2

(12) United States Patent
Wang et al.

(10) Patent No.: US 6,996,994 B2
(45) Date of Patent: Feb. 14, 2006

(54) VACUUM RETENTION METHOD AND SUPERCONDUCTING MACHINE WITH VACUUM RETENTION

(75) Inventors: Yu Wang, Mason, OH (US); Robert Adolph Ackermann, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/766,140

(22) Filed: Jan. 27, 2004

(65) Prior Publication Data

US 2004/0182091 A1  Sep. 23, 2004

Related U.S. Application Data

(62) Division of application No. 10/331,059, filed on Dec. 27, 2002, now Pat. No. 6,708,503.

(51) Int. Cl.
 F25B 19/00 (2006.01)
 F25B 9/00 (2006.01)
(52) U.S. Cl. .............................. 62/6; 62/51.1; 62/259.2
(58) Field of Classification Search .................. 62/6, 62/51.1, 259.2
 See application file for complete search history.

(56) References Cited

U.S. PATENT DOCUMENTS

| 3,916,079 A | * | 10/1975 | Kohler et al. ............. 174/15.3 |
| 4,211,087 A | | 7/1980 | Burnier |
| 4,236,091 A | * | 11/1980 | Kutateladze et al. .......... 310/64 |
| 4,274,022 A | | 6/1981 | Elsel |
| 4,297,602 A | * | 10/1981 | Kobayashi et al. ........... 310/26 |
| 4,297,603 A | * | 10/1981 | Weghaupt ................... 310/53 |
| 4,339,680 A | | 7/1982 | Flecher et al. |
| 4,532,770 A | | 8/1985 | Hakuraku et al. |
| 4,614,093 A | | 9/1986 | Bachler et al. |
| 4,727,724 A | | 3/1988 | Intichar et al. |
| 5,103,647 A | | 4/1992 | Ackermann |
| 5,111,665 A | | 5/1992 | Ackermann |
| 5,426,949 A | * | 6/1995 | Saho et al. ................... 62/51.1 |
| 5,485,730 A | | 1/1996 | Herd |
| 5,513,498 A | | 5/1996 | Ackermann et al. |
| 5,548,168 A | | 8/1996 | Laskaris et al. |

(Continued)

FOREIGN PATENT DOCUMENTS

GB  2245350  1/1992

(Continued)

OTHER PUBLICATIONS

M. Sugimoto et al., "Forcedly Cooled Superconducting Coil Apparatus And Method For Controlling Flow Rate At Its Conducting," JP2000208320, Jul. 28, 2000, pp. 1-5.

*Primary Examiner*—William C. Doerrler
(74) *Attorney, Agent, or Firm*—Penny A. Clarke; Patrick K. Patnode

(57) ABSTRACT

A superconducting machine includes a superconductive device and a vacuum enclosure containing and thermally insulating the superconductive device. A cold-trap is configured to condense gases generated within the vacuum enclosure, and a coolant circulation system is adapted to force flow of a cryogen to and from the superconductive device and the cold-trap. A cryogenic cooling system is configured to cool the cryogen in the coolant circulation system upstream of the superconductive device. A vacuum retention method, for a high-temperature superconductive HTS device, includes applying vacuum to the HTS device to thermally insulate the HTS device, condensing gases generated around the HTS device using a cold-trap, flowing a cryogen to and from the HTS device, and flowing the cryogen to and from the cold-trap.

3 Claims, 4 Drawing Sheets

U.S. PATENT DOCUMENTS

| | | | |
|---|---|---|---|
| 5,647,218 A * | 7/1997 | Kuriyama et al. | 62/6 |
| 5,697,220 A | 12/1997 | Pierce et al. | |
| 5,774,032 A | 6/1998 | Herd et al. | |
| RE36,332 E | 10/1999 | Pierce et al. | |
| 5,966,944 A * | 10/1999 | Inoue et al. | 62/51.1 |
| 6,107,905 A * | 8/2000 | Itoh et al. | 335/216 |
| 6,181,228 B1 | 1/2001 | Laskaris et al. | |
| 6,201,462 B1 | 3/2001 | Laskaris et al. | |
| 6,246,308 B1 | 6/2001 | Laskaris et al. | |
| 6,293,106 B1 | 9/2001 | Acharya et al. | |
| 6,376,943 B1 | 4/2002 | Gamble et al. | |
| 6,412,289 B1 | 7/2002 | Laskaris et al. | |
| 6,415,611 B1 | 7/2002 | Acharya et al. | |
| 6,415,613 B1 * | 7/2002 | Ackermann et al. | 62/51.1 |
| 6,438,969 B1 | 8/2002 | Laskaris et al. | |
| 6,442,949 B1 | 9/2002 | Laskaris et al. | |
| 6,489,701 B1 | 12/2002 | Gamble et al. | |
| 6,708,503 B1 | 3/2004 | Wang et al. | |

FOREIGN PATENT DOCUMENTS

| | | |
|---|---|---|
| GB | 2286450 | 8/1995 |
| GB | 2126694 | 3/2004 |
| JP | 63066907 | 3/1988 |
| JP | 63260007 | 10/1988 |

* cited by examiner

US 6,996,994 B2

VACUUM RETENTION METHOD AND SUPERCONDUCTING MACHINE WITH VACUUM RETENTION

This application is a division of application Ser. No. 10/331,059, filed Dec. 27, 2002, now U.S. Pat. No. 6,708,503, which is hereby incorporated by reference in its entirety.

BACKGROUND OF THE INVENTION

The invention relates generally to vacuum retention for a superconductive machine and, more particularly, to cryogenic cooling and vacuum retention for a high temperature superconductive (HTS) machine. As used here, the term "cryogenic" refers to a temperature less than about 150° Kelvin.

One exemplary superconductive machine is a superconductive rotor for electric generators and motors. Other superconductive machines include magnetic resonance imaging (MRI) systems, for medical applications, and magnetic levitation devices, for transportation applications. Typically, a superconductive coil assembly of a superconducting magnet for a superconductive device includes one or more superconductive coils wound from superconductive wire and which may be generally surrounded by a thermal shield. The assembly is typically contained within a vacuum enclosure.

Some superconductive magnets are conductively cooled by a cryocooler coldhead, such as that of a conventional Gifford-McMahon cryocooler, which is mounted to the magnet. Mounting of the cryocooler coldhead to the magnet, however, creates difficulties including the detrimental effects of stray magnetic fields on the coldhead motor, vibration transmission from the coldhead to the magnet, and temperature gradients along the thermal connections between the coldhead and the magnet. Such conductive cooling is not generally suitable for cooling rotating magnets, such as may constitute a superconductive rotor.

Other superconductive magnets are cooled by liquid helium in direct contact with the magnet, with the liquid helium boiling off as gaseous helium during magnet cooling and with the gaseous helium typically escaping from the magnet to the atmosphere. Locating the containment for the liquid helium inside the vacuum enclosure of the magnet increases the size of the superconductive magnet system, which is undesirable in many applications.

Superconducting rotors include a massive rotor core, which is typically at about room temperature, and a superconducting coil, which is in close proximity to the rotor core and which must be cooled below its operating temperature. The presence of impurities, such as gases, in the vicinity of the superconducting coil may cause ice build-up on the superconducting coil. The ice build-up over time may cause rub damage between moving superconducting coils and may further act as a thermal short between the rotor core and the superconducting coil(s).

Accordingly, superconducting machines, such as superconducting rotors, typically require vacuum insulation of the superconducting element(s) thereof, for example maintaining a vacuum for the superconducting coil(s). One known solution is to warm the superconducting coil, to room temperature, for example, to desorb the gases, which are adsorbed on the surface of the superconducting coil during operation thereof. However, this required shut-down and maintenance is undesirable for commercial power generation applications.

Accordingly, it would be desirable to provide innovations in a superconductive machine for operations over extended periods of time without regeneration. More particularly, it would be desirable to prevent or reduce the adsorption of gases on the superconducting element(s) of the machine, for example on the superconducting coil(s).

SUMMARY

Briefly, in accordance with one embodiment of the invention, a superconducting machine includes a superconductive device, and a vacuum enclosure containing and thermally insulating the superconductive device. A cold-trap is configured to condense gases generated within the vacuum enclosure, and a coolant circulation system is adapted to force flow of a cryogen to and from the superconductive device and the cold-trap. A cryogenic cooling system is configured to cool the cryogen in the coolant circulation system upstream of the superconductive device.

A superconducting rotor embodiment includes a rotor core and at least one superconducting coil extending around the rotor core. A vacuum enclosure 14 contains and thermally insulates the superconductive coil. A cold-trap is configured to condense gases generated within the vacuum enclosure, and a coolant circulation system is adapted to force flow of a cryogen to and from the superconductive coil and the cold-trap. A cryogenic cooling system is configured to cool the cryogen in the coolant circulation system upstream of the superconductive coil.

A vacuum retention method embodiment, for a high-temperature superconductive HTS device, includes applying vacuum to the HTS device to thermally insulate the HTS device, condensing gases generated around the HTS device using a cold-trap, flowing a cryogen to and from the HTS device, and flowing the cryogen to and from the cold-trap.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
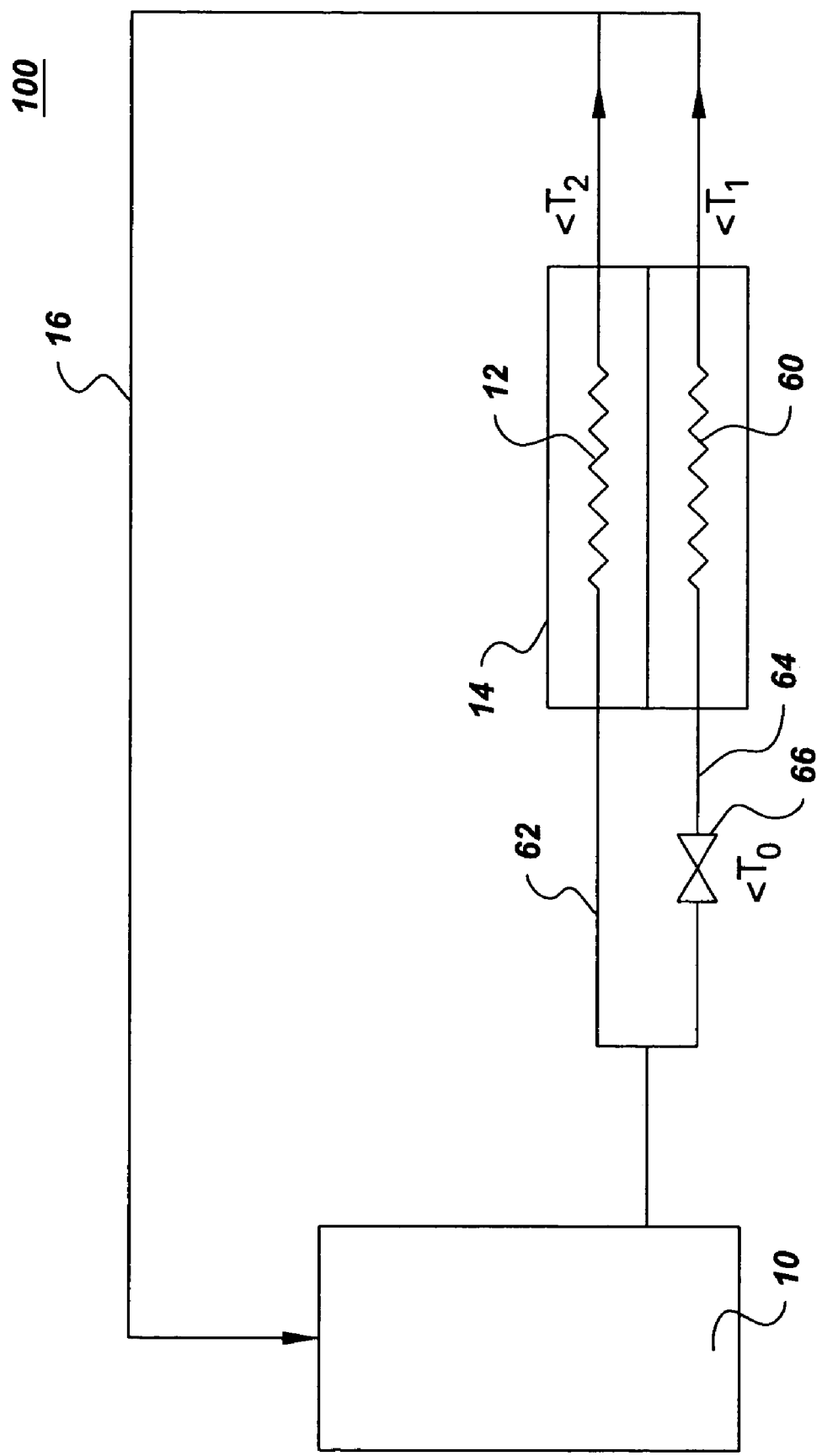
FIG. 1 schematically depicts a superconducting machine embodiment of the invention.

As shown in FIG. 1, a superconducting machine 100 includes a superconductive device 12. Exemplary superconducting devices 12 include superconducting coils and other superconducting magnets. Another exemplary superconducting device 12 is a high-temperature (HTS) superconducting rotor, for use in a HTS generator. A vacuum enclosure 14 contains and thermally insulates the superconductive device 12. A cold-trap 60 is configured to condense gases generated within the vacuum enclosure 14. As use here, the phrase "condensing gases" includes condensation of gases and other impurities that degrade a vacuum. Cold-traps are known and used, for example, on ultra-high vacuum systems in the semiconductor industry. For the embodiment shown in FIG. 1, a coolant circulation system 16 is adapted to force flow of a cryogen to and from the superconductive device 12 and the cold-trap 60. Exemplary cryogens include Helium, Hydrogen, Neon, Nitrogen and mixtures thereof. A cryogenic cooling system 10 is configured to cool the cryogen in the coolant circulation system upstream of the superconductive device 12.

Cryogenic cooling systems 10 are known and will not be discussed in detail here. Exemplary cryocooling systems 10 include liquifiers, Brayton cycle refrigerators, and regenerative crycoolers. Other exemplary crycooling systems are discussed in commonly assigned U.S. Pat. No. 6,442,949, Laskaris et al, "Cryogenic cooling refrigeration system and method having open-loop short term cooling for a superconducting machine" and U.S. Pat. No. 6,438,969, Laskaris et al., "Cryogenic cooling refrigeration system for rotor having a high temperature super-conducting field winding and method," which are incorporated by reference herein.

For the particular embodiment shown in FIG. 1, the coolant circulation system 16 includes a primary cooling line 62, which is configured to cool the superconducting device 12, and a secondary cooling line 64, which is configured to cool the cold-trap 60. Exemplary primary and secondary cooling lines include stainless-steel pipes for flowing the cryogen.

More particularly, the coolant circulation system 16 further includes a flow control valve 66, which is configured to control and apportion the flow of the cryogen between the primary and secondary cooling lines 62, 64, as indicated in FIG. 1. Alternatively, the coolant circulation system 16 may be designed to balance the cryogen flow resistance of the primary and secondary cooling lines 62, 64, in order to provide the desired distribution of cryogen flow between the primary and secondary cooling lines 62, 64.

The inlet temperature of the cryogen in primary cooling line 62 is below the operating temperature of the superconductive device 12. More particularly, the exit temperature T2 of the cryogen in primary cooling line is about the operating temperature of the superconductive device 12. As used here, the inlet and exit temperatures correspond to the temperature of the cryogen supplied to and exiting the superconducting device 12, respectively, in a vicinity of the superconducting device 12. For more particular embodiments, the inlet temperature in primary cooling line 62 is at least about ten degrees Kelvin (10° K.), and more particularly twenty degrees Kelvin (20° K.), below the exit temperature in primary cooling line 62.

Beneficially, the cold-trap 60 removes gases, such as Hydrogen, from the vacuum enclosure 14, in order to achieve a high level vacuum, for example less than about $10^{-5}$ or $10^{-6}$ Torr. To more efficiently trap gases in the vacuum enclosure 14, the inlet temperature T0 for the secondary cooling line 64 is below the triple point for Hydrogen (about 13.81° K.), according to a particular embodiment. More particularly, the exit temperature T1 of the cryogen in the secondary cooling line 64 is below about the triple point for Hydrogen. As used here, the inlet and exit temperatures correspond to the temperature of the cryogen supplied to and exiting the cold-trap 60, respectively, in a vicinity of the cold-trap 60. Having an inlet temperature less than the triple point for Hydrogen facilitates trapping Hydrogen in the cold-trap, thereby increasing the vacuum level within vacuum enclosure 14.

Figure 2:
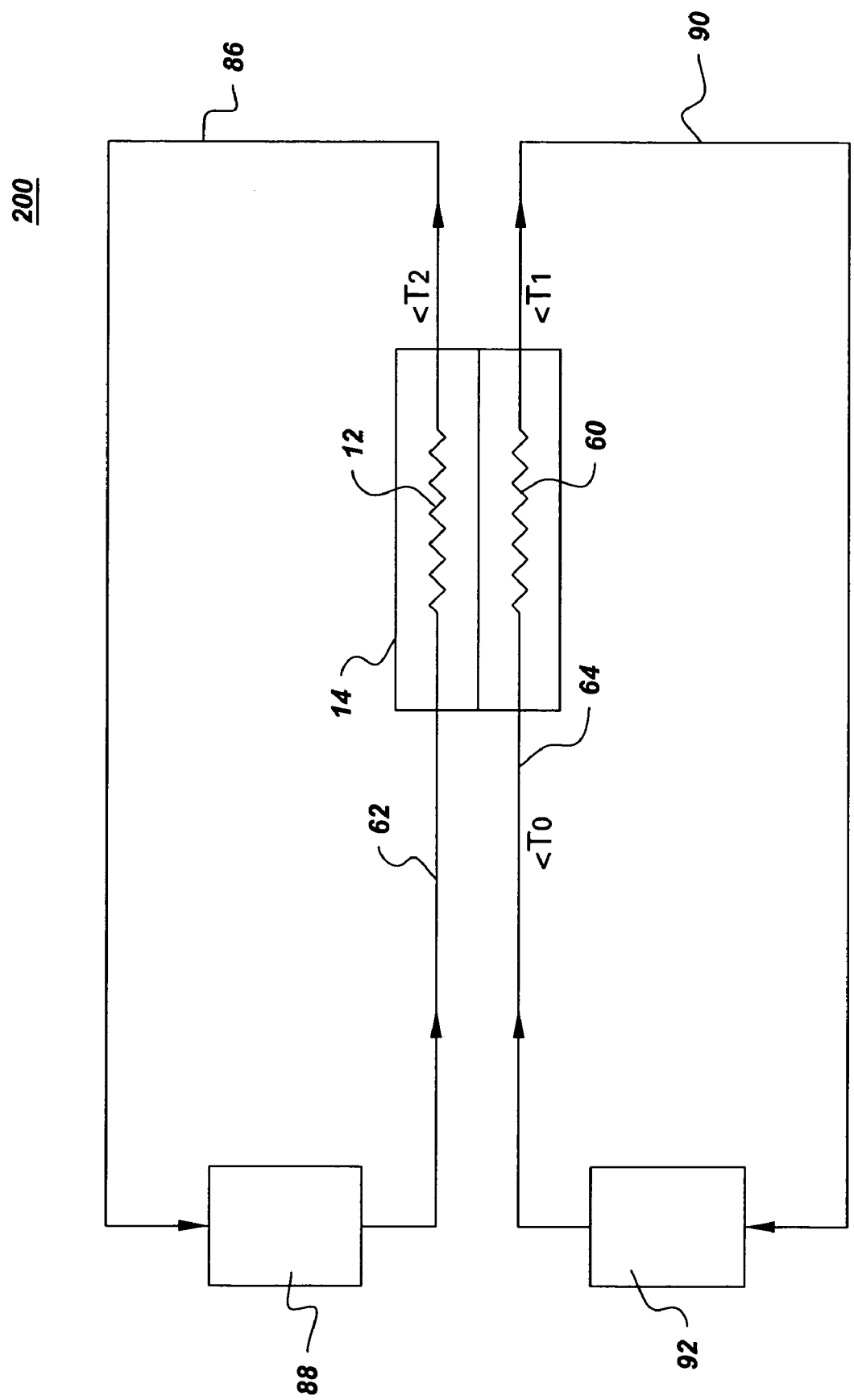
FIG. 2 illustrates another superconducting machine embodiment of the invention.

Another superconducting machine 200 embodiment is described with reference to FIG. 2. As shown, the superconducting machine 200 includes a superconductive device 12, a vacuum enclosure 14 containing and thermally insulating the superconductive device, and a cold-trap 60 configured to condense gases generated within the vacuum enclosure 14. A primary coolant circulation system 86 is adapted to force the flow of a primary cryogen to and from the superconductive device 12, and a primary cryogenic cooling system 88 is configured to cool the primary cryogen in the primary coolant circulation system 88 upstream of the superconductive device 12. A secondary coolant circulation system 90 is adapted to force the flow of a secondary cryogen to and from the cold-trap 60, and a secondary cryogenic cooling system 92 is configured to cool the secondary cryogen in the secondary coolant circulation system upstream of the cold-trap. The primary and secondary cryogens may be the same cryogen or may comprise different cryogens, depending on system requirements. With the exception of the separate coolant circulation systems and cryogenic cooling systems, the embodiment shown in FIG. 2 is similar to that depicted in FIG. 1. Accordingly, details described above with respect to FIG. 1 will not be repeated.

Figure 4:
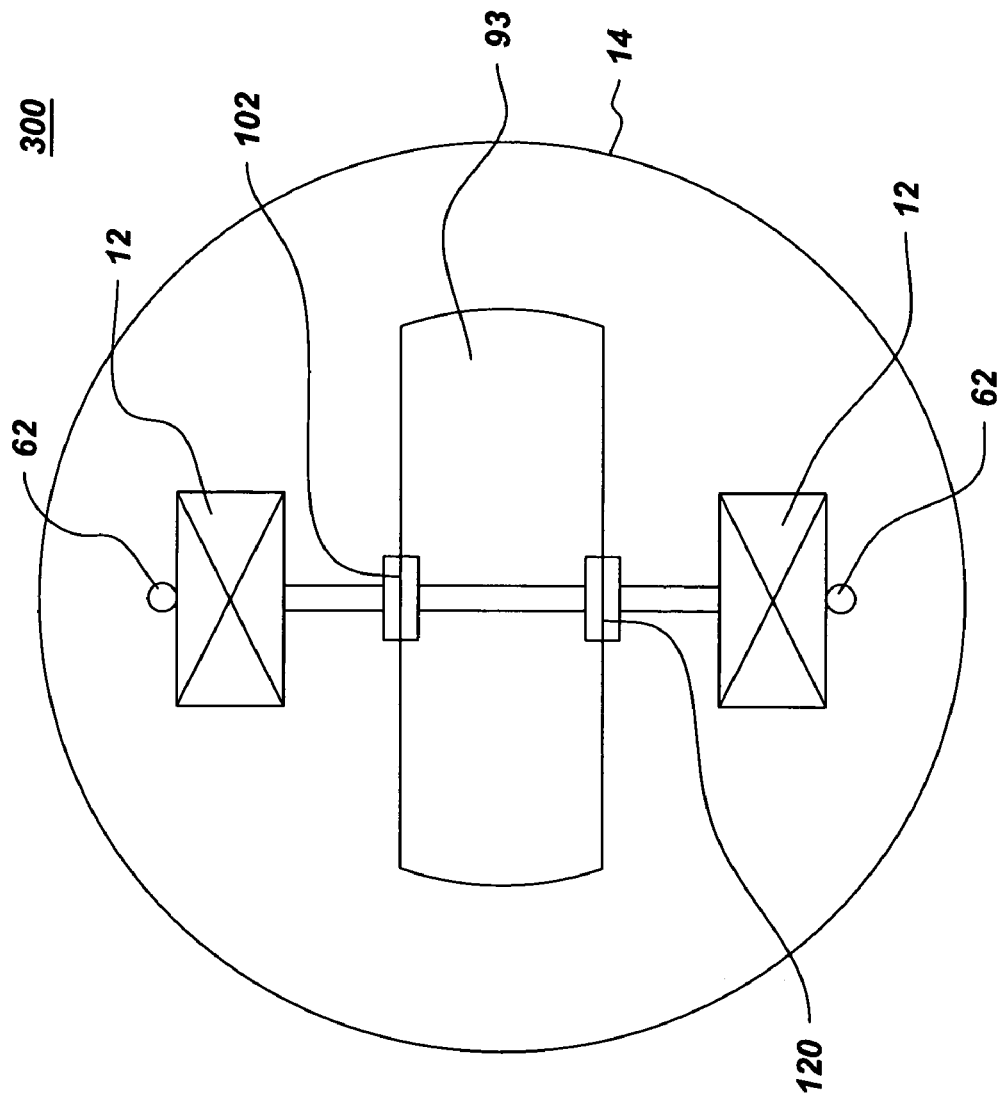
FIG. 4 is a cross-sectional view of the rotor of FIG. 3.

According to a more particular embodiment, the superconducting machine 200 further includes a rotor core 93, and the superconductive device 12 includes at least one superconducting coil 12 extending around the rotor core, as shown in FIG. 4, for example. More particularly, the superconducting coil 12 is a high-temperature superconducting coil. As used here, the phrase "high-temperature superconducting" refers to materials that-are superconducting at temperatures of about fifteen degrees Kelvin (15° K.) or more.

Figure 3:
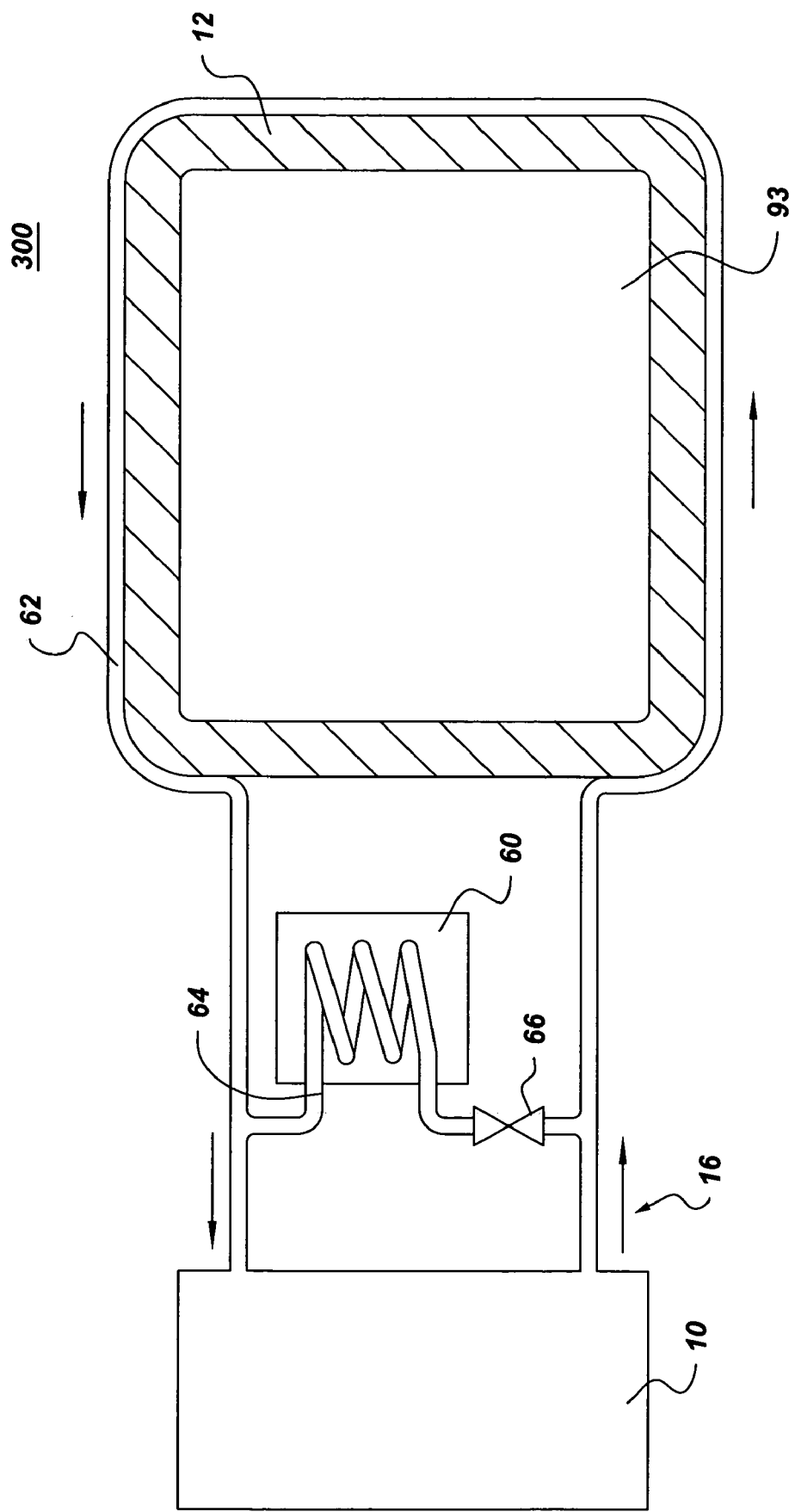
FIG. 3 schematically depicts a superconducting rotor embodiment of the invention.

A superconducting rotor 300 embodiment is described with reference to FIGS. 3 and 4. As shown in FIG. 4, the superconducting rotor 300 includes a rotor core 93 and at least one superconducting coil 12 extending around the rotor core. According to a particular embodiment, the superconducting coil 12 is a—high temperature superconducting (HTS) coil. As indicated in FIG. 4, a vacuum enclosure 14 contains and thermally insulates the superconductive coil 12. As illustrated in FIG. 3, a cold-trap 60 is configured to condense gases generated within the vacuum enclosure 14. A coolant circulation system 16 is adapted to force the flow of a cryogen to and from the superconductive coil 12 and the cold-trap 60, as shown, for example in FIG. 3. A cryogenic cooling system 10 is configured to cool the cryogen in the coolant circulation system upstream of the superconductive coil 12, as indicated in FIG. 3. The coolant circulation system 16 is described above with respect to FIG. 1, and the details will not be repeated.

The rotor core 93 is typically "warm," for example at room temperature (about 300° K.). As indicated in FIG. 4, thermal insulation 102 prevents the rotor core 93 from warming the superconducting coil 12.

As discussed above with respect to FIGS. 1 and 2, use of the cold-trap 60 to condense gases in the vacuum enclosure 14 and, more particularly, maintaining the inlet temperature T0 for the cryogen flowing to cold-trap 60 below the triple point of Hydrogen facilitates achieving a high level of vacuum within vacuum enclosure 14.

A vacuum retention method for a high-temperature superconductive (HTS) device 12 is also disclosed. The method includes applying vacuum to the HTS device 12 to thermally insulate the HTS device, condensing gases generated around the HTS device using a cold-trap 60, flowing a cryogen to and from the HTS device to cool the HTS device, and flowing the cryogen to and from the cold-trap. More particularly, the method further includes cooling the cryogen upstream of the HTS device 12 and controlling the flow of the cryogen to the HTS device 12 and the cold-trap 60. Still more particularly, the method further includes trapping the condensed gases using the cold-trap 60.

As noted above with respect to the machine embodiment, the inlet temperature of the cryogen flowing to the HTS device 12 is below an operating temperature of the HTS device. More particularly, the exit temperature of the cryogen flowing from the HTS device is about the operating temperature of the HTS device. To enhance trapping within the cold-trap 60 and thereby increase the level of vacuum for the HTS device 12, the inlet temperature of the cryogen flowing to the cold-trap 60 is below the triple point for Hydrogen. More particularly, the exit temperature of the cryogen flowing from the cold-trap 60 is below about the triple point for Hydrogen.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A superconducting machine comprising:
    a superconductive device;
    a vacuum enclosure containing and thermally insulating said superconductive device;
    a cold-trap configured to condense gases generated within said vacuum enclosure;
    a primary coolant circulation system adapted to force flow of a primary cryogen to and from said superconductive device, wherein said primary coolant circulation system comprises a primary cooling line configured to cool said superconducting device;
    a primary cryogenic cooling system configured to cool the primary cryogen in said primary coolant circulation system upstream of said superconductive device;
    a secondary coolant circulation system adapted to force flow of a secondary cryogen to and from said cold-trap, wherein said secondary coolant circulation system comprises a secondary cooling line configured to cool said cold-trap, wherein said secondary coolant circulation system does not supply the secondary cryogen to said primary coolant circulation system, and wherein an inlet temperature of said secondary cooling line is below about the triple point for Hydrogen; and
    a secondary cryogenic cooling system configured to cool the secondary cryogen in said secondary coolant circulation system upstream of said cold-trap.

2. The superconducting machine of claim 1, further comprising a rotor core, wherein said superconductive device comprises at least one superconducting coil extending around said rotor core.

3. The superconducting machine of claim 2, wherein said superconducting coil comprises a high-temperature superconducting coil.

* * * * *